US000001983H

(19) United States

(12) Statutory Invention Registration (10) Reg. No.: US H1983 H

Foster (43) Published: Aug. 7, 2001

(54) THERMAL BATTERY AND METHOD OF MAKING THE SAME HAVING SOLID COMPLEX OF $SO_2$ AND LITHIUM TETRACHLOROALUMINATE AS ELECTROLYTE

(75) Inventor: Donald Foster, Laurel, MD (US)

(73) Assignee: The United States of America as represented by the Secretary of the Army, Washington, DC (US)

(21) Appl. No.: 09/299,933

(22) Filed: Apr. 27, 1999

(51) Int. Cl.[7] ..... H01M 6/36

(52) U.S. Cl. ..... 429/112

(58) Field of Search ..... 429/112, 52, 319, 429/346, 119

(56) References Cited

U.S. PATENT DOCUMENTS

| | | | |
|---|---|---|---|
| 4,066,824 | 1/1978 | Rao et al. | 429/50 |
| 4,117,207 | 9/1978 | Nardi et al. | 429/103 |
| 4,207,388 | 6/1980 | Erbacher et al. | 429/112 |
| 4,513,067 | 4/1985 | Kuo et al. | 429/101 |
| 4,764,438 | 8/1988 | Vaughn et al. | 429/52 |
| 4,891,281 | 1/1990 | Kuo et al. | 429/105 |
| 5,731,102 * | 3/1998 | Monahan . | |

OTHER PUBLICATIONS

Miles, Jun. 1996, US Statutory Invention Registration # H1544.*

Foster et al., "New Highly Conductive Inorganic Electrolytes—The Liquid SO2 Solvates of the Alkali and Alkaline Earth Metal Tetrachloroaluminates," J. Electrochem. Soc., vol. 135, No. 11, pp. 2682–2686 (Nov. 1988).

Dey et al., "Inorganic Electrolyte Li/CuCl2 Rechargeable Cell," J. Electrochem. Soc., vol. 136, No. 6, pp. 1618–1621 (Jun. 1989).

* cited by examiner

*Primary Examiner*—Michael J. Carone

(74) *Attorney, Agent, or Firm*—Paul S. Clohan

(57) ABSTRACT

A light weight, thermal battery having a cathode, an anode and a solid complex of $SO_2$ and lithium tetrachloroaluminate as the solid electrolyte therein. The solid complex of $SO_2$ and lithium tetrachloroaluminate is represented by the formula $LiAlCl_4 \cdot xSO_2$, wherein $1.0<x<4$. The thermal battery is activated by heating the battery to temperatures of approximately between 35° C. to 90° C. A method of making the thermal battery is taught.

14 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

THERMAL BATTERY AND METHOD OF MAKING THE SAME HAVING SOLID COMPLEX OF $SO_2$ AND LITHIUM TETRACHLOROALUMINATE AS ELECTROLYTE

GOVERNMENT INTEREST

The invention described herein may be manufactured, used and licensed by or for the U.S. Government without the payment of any royalty thereon.

FIELD OF THE INVENTION

The present invention relates, in general, to a storage stable, primary or secondary, light weight, thermal battery that is heat activated by heating the battery to only approximately between 35° C. to 90° C. More particularly, the present invention relates to a thermal battery that employs a complex of sulfur dioxide and lithium tetrachloroaluminate as the electrolyte. Once heat activated, the thermal battery can remain active until it is completely discharged. No additional heating is needed. Moreover, the thermal battery of the present invention, once heat activated can be used at ambient and sub-ambient temperatures. A method of making the thermal battery is disclosed.

BACKGROUND OF THE INVENTION

Thermal batteries generally contain an active metal anode, a cathode and an electrolyte that is solid at normal, ambient temperatures. A current thermal battery, for instance, may comprise a lithium or lithium alloy anode, an $FeS_2$ cathode and a LiCl/KCl eutectic mixture electrolyte. Because thermal batteries employ an electrolyte that is solid at normal, ambient temperatures, storability of the battery at ambient temperatures is excellent due to the slow kinetics of the solid to solid reaction between the solid electrolyte and the electrodes as well as the inertness of the electrolyte. At normal ambient temperatures, the solid electrolyte provides very high electrical resistivity allowing no current to pass.

When power is needed, thermal batteries are activated by use of a pyrotechnic heat source to rapidly heat and melt the solid electrolyte to a highly conductive liquid. In order to activate these types of batteries, conventional, pyrotechnic heat sources must generally heat the solid electrolyte to over 450° C. in a time period of often less than two (2) seconds. Once activated, if the battery cell can uphold the very high temperature necessary to maintain the electrolyte in its molten state, the batteries could generate power for anywhere from a few seconds up to complete discharge of the battery.

Because of the high temperature of over 450° C. required to melt the solid electrolyte, a large amount of pyrotechnic heating materials must be used. The need for such great quantities of pyrotechnic heating materials adds significantly to the overall weight and size of the thermal battery. This is undesirable. Ideally, one would like to minimize the size and weight of any power source used.

Moreover, once the thermal battery has been activated, it is often a problem maintaining the high temperatures needed to keep the electrolyte in its molten state until power is no longer needed.

In addition, heating the state of the art thermal batteries to such high temperatures in order to melt the electrolytes and activate the battery requires significant time. The time required to activate prior art thermal batteries is on the order of tens to hundreds of milliseconds. It would be desirable to minimize this activation time.

Accordingly, it is desirable to find a suitable electrolyte for use in a thermal battery having a lower melting point than those employed by the prior art thermal batteries; consequently, melting the electrolyte and maintaining it in its molten state would require lesser quantities of heating materials. In addition, it is further desirable to provide a thermal battery cell the activation of which could be accomplished in a lesser amount of time and using lesser amounts of heating materials.

U.S. Pat. No. 4,764,438 (Vaughn et al.) provides a lightweight, thermally activated, solid state, electrochemical power supply which utilizes a solid alkali metal tetrachloroaluminate electrolyte in combination with a transition metal chloride containing cathode. The battery taught is thermally activated at relatively low temperatures of approximately 85° C. to 105° C. The battery taught, however, is not a thermal battery in accordance with the accepted definition of the term "thermal battery." The electrolyte in Vaughn et al. does not melt during the operation of the battery cell. The cell taught by Vaughn et al. is activated below the melting point of the electrolyte.

U.S. Pat. No. 4,117,207 (Nardi et al.) teaches a thermal battery which is activated at a relatively low temperature range of 165° C. to 250° C. Although the temperature taught by Nardi et al. to activate the thermal battery is lower than that needed to activate other conventional thermal batteries, it would be desirable to provide a thermal battery that can be activated at yet even lower temperatures; and hence, require the use of less pyrotechnic heating materials and provide for shorter activation times as well.

Nardi et al. further teaches a conventional method of making a thermal battery, which requires obtaining, and sometimes preparing, each of the cathode, electrolyte and anode materials in pulverized/powder form. Each of these materials is then separately die pressed layer-by-layer in an apparatus, such as the Carver die to provide a thermal battery wherein a solid electrolyte is sandwiched between a cathode and an anode. This method can be time consuming and complex when one considers the various steps that are needed to be employed in preparing the individual component materials and in the pressing of the various component parts to form the final battery product. Vaughn et al. teaches this method as well as a method for producing the batteries therein.

The present invention provides for a novel and relatively easy method for making the thermal batteries within the scope of the invention. This method eliminates the numerous steps needed and employed by the prior art.

There exists a continuing need to develop a thermal battery that is smaller, lighter and more quickly activated than conventional, thermal batteries. Moreover, there is a continuing need to provide a thermal battery that can be activated at temperatures significantly lower than those employed in the prior art thermal battery art. In addition, there is a need to maintain the molten state of an electrolyte once melted after all pyrotechnic heating materials are exhausted. Being able to accomplish this and provide a method for making such thermal batteries in a relatively simple and cost-effective fashion is further desirable. The present invention provides a solution to meet the needs described.

BRIEF DESCRIPTION OF THE INVENTION

The present invention relates to a high energy, light weight, thermal battery that may be quickly activated at temperatures ranging from approximately between 35° C. to 90° C. and a method for making the same. The thermal battery within the scope of the present invention employs a cathode, an anode, and a solid electrolyte of the formula $LiAlCl_4 \cdot xSO_2$, wherein 1.0<x<4.

The solid electrolyte used becomes molten at temperatures significantly lower than those temperatures needed to melt the solid electrolytes employed in prior art thermal batteries. Moreover, the solid electrolyte employed herein, once melted at temperatures greater than ambient temperature, freezes at temperatures significantly less than their original melting point. As a matter of fact, the electrolyte employed, once melted, remains in its molten state at ambient, and even sub-ambient temperatures. This electrolyte is, in essence, a supercooled liquid. Because of the properties of the electrolytes employed within the scope of the present invention, the amount of pyrotechnic materials needed to activate the thermal battery herein and maintain its activity until it is completely discharged is merely the amount needed to bring the solid electrolyte into its molten state. This amount of pyrotechnic material needed is significantly less than that required in conventional thermal battery operation.

Accordingly, it is an object of the invention to provide a thermal battery which can be activated at a much lower temperature than conventional state of the art thermal batteries.

It is an object of the present invention to provide a thermal battery which can be quickly activated by heating the battery to a temperature of approximately 35° C. to 90° C. so as to melt the solid electrolyte therein.

It is a further object of the present invention to provide a thermal battery wherein the solid electrolyte therein can be thermally melted at temperatures ranging from approximately 15° C. to 70° C. above normal, ambient temperature.

A further object of the present invention is to provide a thermal battery that may be activated more rapidly than prior art thermal batteries since less heating and consequently less heating materials are required to activate the battery than required by the prior art.

It is a further object of the invention to provide a thermal battery wherein once the cell electrolyte is brought to its molten state, additional or continuous heating of the electrolyte in order to maintain activation of the battery and completely discharge the battery is no longer needed regardless of how slowly the battery is discharged.

Yet another object of the invention is to provide a thermal battery that once activated, can be used at ambient and sub-ambient temperatures.

Still another object of the present invention is to provide a light weight, low temperature thermally activated electrochemical cell having extended storage shelf life.

An additional object of the invention is to provide a method for making thermal batteries having these desired properties.

The means to achieve these and other objectives of the present invention will be apparent from the following description of the invention and claims.

BRIEF DESCRIPTION OF THE DRAWINGS

The present invention will be described with reference to FIG. 1.

DETAILED DESCRIPTION OF THE INVENTION

Figure 1:
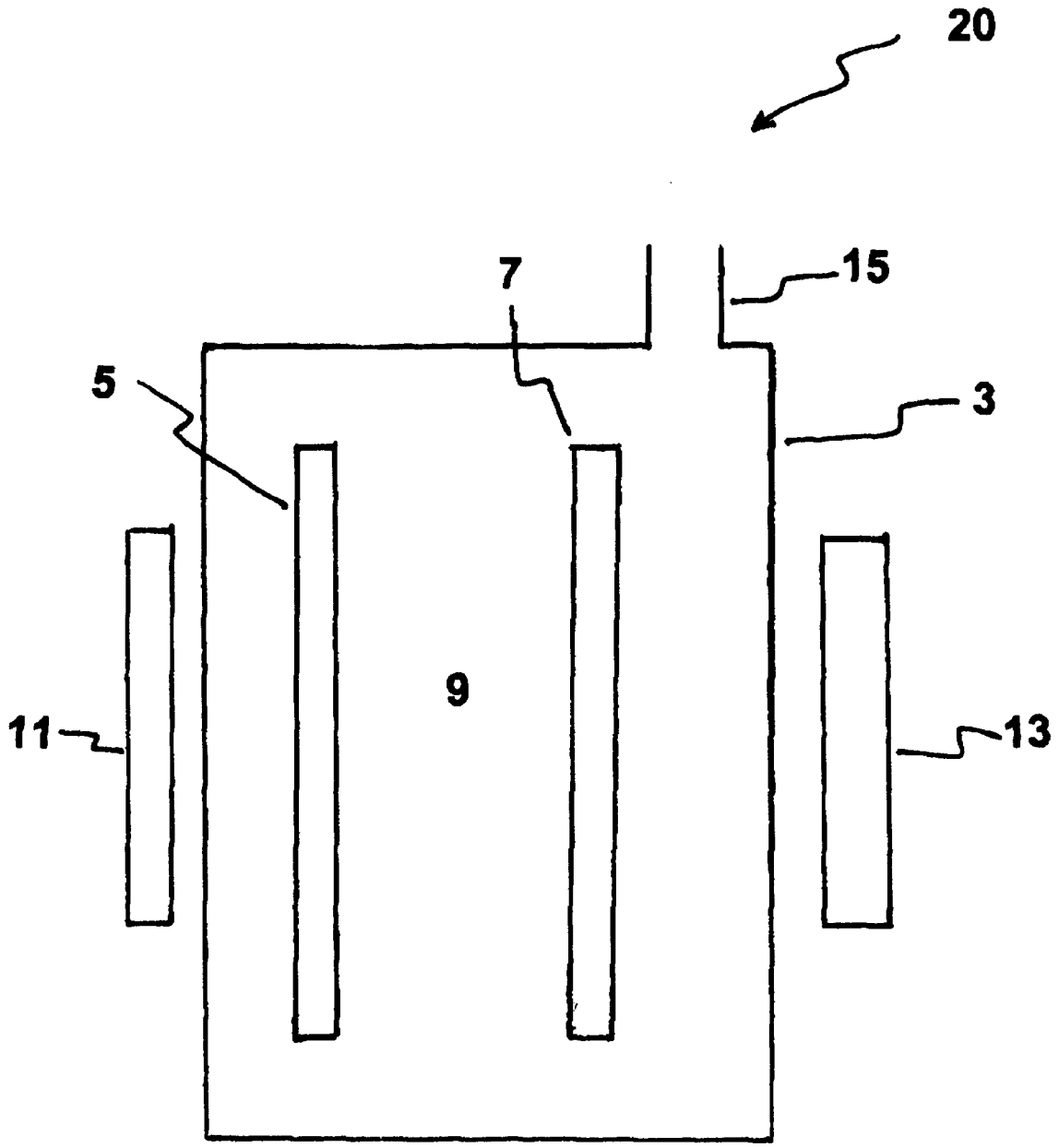
FIG. 1 illustrates a cross section of a thermal battery within the scope of the present invention.

The thermal batteries within the scope of the present invention may be of either the primary or rechargeable class of thermal batteries. Pursuant to the objects set forth above, the present invention provides a high energy, high power source having a cathode, an anode and a solid electrolyte represented by the formula $LiAlCl_4 \cdot xSO_2$, wherein 1.0<x<4. The thermal batteries herein can be quickly activated thermally by melting the solid electrolyte therein at temperatures between approximately 15° C. to 70° C. above normal ambient temperature (approximately 35° C. to 90° C.).

A typical thermal battery within the scope of the present invention can be described with reference to FIG. 1. FIG. 1 is a schematic illustration of the cross section of a thermal battery 20 within the scope of the present invention. The figure illustrates cell/battery casing 3, having positioned therein cathode 5 and anode 7, between which is sandwiched solid electrolyte 9. FIG. 1 further illustrates the presence of conventional heat pellets 11 and 13, which may be employed to activate thermal battery 20.

Cell casing materials, such as nickel or nickel plated cold rolled steel may be employed as cell/battery casing 3. One having ordinary skill in the art would be able to select the material best suited to employ as the cell casing 3 herein. Selection of the casing material, as one having skill in the art is aware, largely depends on whether or not the the casing is connected to the negative electrode.

Cathode 5 may be composed of a porous, high surface area carbon (i.e. Ketjen Black) or a solid cathode material such as $CuCl_2$, CuCl, CuO (cupric oxide), $NiCl_2$ or $MnO_2$, or other, like solid cathode materials. The preferred cathode has a high surface area and may be composed of Ketjen Black, wherein Teflon® is the binder employed.

Anode 7 may be composed of lithium metal or lithium alloyed with other metals such as aluminum, silicon, tin or like metals.

The solid electrolyte 9 within the scope of the present invention, which provides thermal battery 20 with the sought after properties disclosed and is a critical element herein, is a complex of sulfur dioxide and lithium tetrachloroaluminate. This solid complex is represented by the formula $LiAlCl_4 \cdot xSO_2$, wherein 1.0<x<4. The preferred electrolyte is one wherein the value of "x" is 2. A method of producing the electrolytes to be used within the scope of the present invention is described by Kuo et al., in U.S. Pat. No. 4,891,281, which description is incorporated herein by reference. The electrolytes produced by Kuo et al., however, are in their liquid state. The sulfur dioxide complexes taught by Kuo et al. are highly conductive, non-pressurized liquids that must be frozen below temperatures of approximately −10° C. to be employed as the solid electrolyte of the thermal battery herein. Conventional methods of freezing may be employed.

The electrolytes employed by the present invention have many desirable properties for use in thermal batteries and the method of making said batteries. These properties can be described as follows:

(1) As mentioned above, when the electrolytes are produced, they are initially liquid at ambient temperature and must be frozen solid in order to be employed as an electrolyte in a thermal battery. The liquid form is used in the novel method of making the thermal batteries herein. The method will be described at a later point in this application.

(2) Once frozen solid at temperatures of below −10° C., the solid form of these electrolytes ("solid electrolytes" herein) has melting points within the range of approximately 35° C. to 90° C. The actual melting point of these electrolytes within this range depends on the ratio of $LiAlCl_4$ to $SO_2$ in the electrolyte complex. One having ordinary skill in the art would be able to determine the desirable ratio of the complex to employ in order to make a thermal battery having a specific activation temperature within the above range. The melting points of these electrolytes is significantly lower than the melting points of conventional electrolytes employed in the thermal battery art; and, therefore, lesser amounts of heating materials would be required to bring these electrolytes to their molten state when employed in a thermal battery.

(3) Moreover, once these solid electrolytes have been heated to their molten state, therefore activating the thermal battery within which they are employed, the molten complex has the property of supercooling. Stated differently, once molten, the liquid complex has the property of remaining in its molten state to temperatures well below the temperature at which it became molten—to temperatures even well below 0° C. This property allows the thermal battery within which the solid electrolyte herein is employed, once activated, to remain active at ambient, and even sub-ambient, temperatures.

(4) In addition, in their molten state, these non-pressurized electrolytes have very high conductivity in the order of approximately 0.1 S/cm at 25° C. and 0.2 S/cm at 60° C. This property permits good high rate discharge performance for a battery within which the electrolyte is employed.

(5) In their solid state, the electrolytes employed herein are very resistive, shutting down the battery from discharge, and also providing favorable storage characteristics to the thermal battery itself. These characteristics provided to the battery when the electrolyte is in its solid state is due to the slow solid to solid reaction of the electrolyte with the electrodes in the battery.

The present invention also relates to a method of making the thermal batteries herein. The method employed herein does not resemble prior art methods of making thermal batteries. As discussed in the background, conventional thermal batteries are made by employing the pulverized/powder form of the materials of the various battery component parts (i.e., anode, cathode, electrolyte) and die pressing each component individually so as to provide the end product. Because the electrolytes employed herein are initially liquid at ambient temperature when produced, the complex, multiple-step method of die press need not be employed herein. Reference to FIG. 1 will be made to describe the novel method herein.

The thermal battery 20 within the scope of the present invention may be made in a relatively simple fashion by first positioning a cathode 5 and an anode 7 within cell/battery casing 3 in a conventional fashion. Once the cathode 5 and anode 7 have been secured into the casing 3, an electrolyte 9 within the scope of the present invention in its liquid state (i.e., either in its liquid state after being initially produced or in its liquid supercooled state), is poured at ambient temperature into the case 3 via fill port 15. Once cell casing 3 has been filled with electrolyte 9 in its liquid state, the cell casing 3 is then sealed in a conventional fashion well within the skill of the art. The cell with its contents (also referred to as the thermal battery 20) is then chilled to a specific temperature, for example to below approximately −10° C., in order to freeze the electrolyte 9 therein. The electrolyte 9, once frozen solid, will remain in its solid state until the thermal battery 20 is heated, using heat pellets 11 and 13, to temperatures above the melting point of the now solid electrolyte 9 employed. This melting point of solid electrolyte 9 is within the temperature range of approximately 35° C. to 90° C. Heating the thermal battery 20 to or above the melting point of electrolyte 9 activates the battery for discharge.

In the embodiment set forth in FIG. 1, conventional heat pellets 11 and 13 are positioned outside the cell/battery casing 3. Any conventional heating elements/means employed in the thermal battery arts may be employed herein. Moreover, the conventional heating elements may be positioned either within the cell/battery casing 3 or external to it. The type of heating elements employed and the positioning of these conventional heating elements is not critical to the present invention, so long as they operate to provide the essential heating of the solid electrolyte 9 to initiate discharge of the thermal battery cell 20. One having ordinary skill in the art would be able to select the type and position of conventional heating elements to employ herein.

Conventional separators (not shown), such as porous membranes of polypropylene, may also be employed in the thermal battery 20 to prevent the cathode 5 and anode 7 from coming into contact with one another.

One having ordinary skill in the art will understand from the description herein that the thermal battery within the scope of the present invention can be activated at a much lower temperature than that required by conventional, state of the art thermal batteries. Consequently, less pyrotechnic, heat source material is required for activation. Since lesser amounts of heat source materials are needed to activate the thermal battery, the batteries herein are smaller, lighter and can be activated more quickly than conventional thermal batteries.

An additional property of the thermal battery within the scope of the present invention is that once the thermal battery has been activated by heating the electrolyte to its molten state, the electrolyte employed herein will not resolidify when it reaches or goes below that temperature at which it originally started melting. Once in its molten state, the electrolyte remains molten at ambient, and even sub-ambient, temperatures. Hence, the thermal battery within the scope of the present invention is the first thermal battery that, once activated, can be used at ambient and sub-ambient temperatures. The electrolyte employed, once molten, can be cooled to temperatures below the melting point as a supercooled liquid. Therefore, under most conditions, the entire thermal battery cell capacity can be utilized once the electrolyte is in its molten state if necessary.

The thermal battery cell of the present invention has excellent shelf stability.

While particular embodiments of the present invention have been shown and described, it will be obvious to those skilled in the art that changes and modifications may be made without departing from this invention. Therefore, it is intended that the claims herein are to include all such obvious changes and modifications as fall within the true spirit and scope of this invention.

I claim:

1. A light weight, thermal battery comprising an anode;

a cathode; and a solid electrolyte positioned between and in contact with said anode and said cathode, wherein said solid electrolyte is a complex of $SO_2$ and lithium tetrachloroaluminate.

2. The thermal battery of claim 1, wherein said solid electrolyte is represented by the formula $LiAlCl_4 \cdot xSO_2$, wherein $1.0<x<4$.

3. The thermal battery of claim 2, wherein said solid electrolyte is $LiAlCl_4 \cdot 2SO_2$.

4. The thermal battery of claim 1, wherein said solid electrolyte has a melting point ranging from approximately 35° C. to 90° C.

5. The thermal battery of claim 1, wherein said anode is composed of lithium or lithium alloyed with a metal selected from the group consisting of aluminum, silicon and tin.

6. The thermal battery of claim 1, wherein said cathode is composed of a porous, high surface area carbon, $CuCl_2$, CuCl, CuO, $NiCl_2$ or $MnO_2$ or mixtures thereof.

7. A method for producing a light-weight, thermal battery comprising the steps of:

providing a thermal battery cell case;

positioning within said thermal battery cell case an anode and a cathode;

filling, at ambient temperature, said thermal battery cell case, having positioned therein said anode and said cathode, with a liquid electrolyte;

sealing said thermal battery cell case having positioned therein said anode, said cathode and said liquid electrolyte; and cooling said sealed thermal battery cell case having therein said anode, cathode and liquid electrolyte to a temperature sufficient to freeze said liquid electrolyte, wherein said liquid electrolyte is a complex of $SO_2$ and lithium tetrachloroaluminate.

8. The method of claim 7, wherein said temperature sufficient to freeze said liquid electrolyte is below approximately −10° C.

9. The method of claim 7, wherein said liquid electrolyte is represented by the formula $LiAlCl_4 \cdot xSO_2$, wherein 1.0<+ <4.

10. The method of claim 9, wherein said liquid electrolyte is $LiAlCl_4 \cdot 2SO_2$.

11. The method of claim 7, wherein said liquid electrolyte, once frozen, has a melting point ranging from approximately 35° C. to 90° C.

12. The method of claim 7, wherein said anode is composed of lithium or lithium alloyed with a metal selected from the group consisting of aluminum, silicon and tin.

13. The method of claim 7, wherein said cathode is composed of a porous, high surface area carbon, $CuCl_2$, CuCl, $NiCl_2$ or $MnO_2$ or mixtures thereof.

14. The method of claim 7, wherein said thermal battery cell case is composed of nickel or nickel plated cold rolled steel.

* * * * *